US011082392B1

(12) United States Patent
Kaliski, Jr. et al.

(10) Patent No.: US 11,082,392 B1
(45) Date of Patent: Aug. 3, 2021

(54) BALANCING VISIBILITY IN THE DOMAIN NAME SYSTEM

(71) Applicant: VERISIGN, INC., Reston, VA (US)

(72) Inventors: Burton S. Kaliski, Jr., McLean, VA (US); Shumon Huque, Reston, VA (US)

(73) Assignee: VERISIGN, INC., Reston, VA (US)

( * ) Notice: Subject to any disclaimer, the term of this patent is extended or adjusted under 35 U.S.C. 154(b) by 0 days.

(21) Appl. No.: 16/669,141

(22) Filed: Oct. 30, 2019

Related U.S. Application Data

(63) Continuation of application No. 14/627,506, filed on Feb. 20, 2015, now Pat. No. 10,530,734.

(60) Provisional application No. 62/092,474, filed on Dec. 16, 2014.

(51) Int. Cl.
*H04L 29/12* (2006.01)
*H04L 29/08* (2006.01)

(52) U.S. Cl.
CPC .......... *H04L 61/10* (2013.01); *H04L 61/1511* (2013.01); *H04L 67/28* (2013.01); *H04L 67/30* (2013.01)

(58) Field of Classification Search
CPC .......... H04L 61/1511; H04L 29/12066; H04L 67/16; H04L 61/1541
See application file for complete search history.

(56) References Cited

U.S. PATENT DOCUMENTS

| 9,473,516 | B1 | 10/2016 | Jezorek et al. | |
|---|---|---|---|---|
| 2003/0182447 | A1* | 9/2003 | Schilling | H04L 61/1552 709/245 |
| 2004/0194102 | A1 | 9/2004 | Neerdaels | |
| 2005/0259645 | A1 | 11/2005 | Chen et al. | |
| 2006/0088039 | A1 | 4/2006 | Kakivaya et al. | |
| 2006/0129665 | A1 | 6/2006 | Toebes et al. | |
| 2007/0160200 | A1* | 7/2007 | Ishikawa | H04L 61/1511 380/30 |
| 2009/0157889 | A1* | 6/2009 | Treuhaft | H04L 69/22 709/230 |

(Continued)

FOREIGN PATENT DOCUMENTS

KR 10-2007-0113600 A 11/2007

OTHER PUBLICATIONS

Anonymous: RSSAC-001, "Service Expectations of Root Servers", XP055273350, Retrieved from the Internet: URL: https://www.icann.org/en/systemlfiles/files/rssac-001-rafl-02may13-en.pdf [retrieved on May 18, 2016], sections 3.8.2 and 4, May 2, 2013, pp. 1-10.

(Continued)

*Primary Examiner* — Joe Chacko
(74) *Attorney, Agent, or Firm* — Artegis Law Group, LLP

(57) ABSTRACT

Systems and methods for out-of-band communications in the domain name system (DNS) are disclosed. Embodiments include a system for negotiating DNS services in the DNS. The system includes an in-band communication channel connecting a first party and a second party, and one or more out-of-band communication channels connecting the first party and the second party. The first party performs messaging for the DNS services with the second party using the in-band communication channel. Further, the first party advertises terms of the DNS service offered by the second party using the one or more out-of-band communication channels.

24 Claims, 10 Drawing Sheets

(56) References Cited

U.S. PATENT DOCUMENTS

| | | |
|---|---|---|
| 2013/0254423 A1 | 9/2013 | George, IV |
| 2015/0180892 A1* | 6/2015 | Balderas ............ H04L 61/1511 726/11 |
| 2015/0295882 A1 | 10/2015 | Kaliski, Jr. |
| 2015/0304199 A1 | 10/2015 | Leask et al. |
| 2016/0036848 A1 | 2/2016 | Reddy et al. |

OTHER PUBLICATIONS

Savolainen et al., "Improved Recursive DNS Server Selection for Multi—Interfaced Nodes", RFC 6731, Internet Engineering Task Force, IETF; Standard, Internet Society (ISOC) 4, Geneva, Switzerland, Dec. 19, 2012, pp. 12-14.
Damas et al., "Extension Mechanisms for DNS (EDNS(0))", RFC 6891, Internet Engineering Task Force, IETF; Standard, Internet Society (ISOC) 4, Geneva, Switzerland, Apr. 17, 2013, pp. 479-480.
Sevilla et al., "iDNS: Enabling Information Centric Networking Through the DNS", 2014 IEEE Conference on Computer Communications Workshops (INFOCOM WKSHPS), IEEE, Apr. 27, 2014, pp. 476-481.
Nagele, Wolfgang, "Analysis of Increased Query Load on Root Name Servers—RIPE Labs", Retrieved from the Internet, URL: https://labs.ripe.net/Members/wnagele/analysis-of-increased-query-load-on-root-name-servers [retrieved on May 18, 2016], Jul. 11, 2011, 7 pages.
Anonymous: "ICANN: ccTLD Constituency Draft Contract for Services: Nov. 14, 2000", Retrieved from the Internet: URL: https://archive.icann.org/en/cctlds/cctldconst-8th-draft-contract-14nov00.htm [retrieved on May 18, 2016], Nov. 14, 2000, 4 pages.
Edmonds, R., "Signaling DNS Capabilities draft-edmonds-dnsop-capabilities-00", https://datatracker.ietf.org/doc/draft-edmonds-dnsop-capabilities/, Jul. 2, 2017, 9 pages.
"https://www.iana.org/assignments/dns-parameters/dns-parameters.xhtml#dns-parameters-1", Aug. 30, 2017, 11 pages.
Herzberg et al., "Negotiating DNSSEC Algorithms Over Legacy Proxies", International Conference on Cryptology and Network Security, Springer, DOI:10:1007/978-3-319-12280-9_8, Oct. 2014, pp. 1-16.
Herzberg et al., "Less is more: Cipher-Suite Negotiation for DNSSEC" Proceedings of the 30th Annual Computer Security Applications Conference. ACM, http://dx.doi.org/10.1145/2664243.2664283, Dec. 8-12, 2014, 10 pages.
Huque et al., "Algorithm Negotiation in DNSSEC draft-huque-dnssec-alg-nego-00", https://datatracker.ietf.org/doc/draft-huque-dnssec-alg-nego/, Jul. 20, 2017, 9 pages.
Shaikh et al., "On the Effectiveness of DNS-based Server Selection", Proceedings IEEE INFOCOM 2001, vol. 3, DOI: 10.1109/INFCOM.2001.916678, Apr. 22-26, 2001, pp. 1801-1810.
Shimokawa et al., "Flexible Server Selection in Widely Distributed Environments", Research Reports on Information Science and Electrical Engineering, vol. 5, No. 1, Mar. 2000, pp. 7-12.
Daley, G., "Use of DNS SRV records for host selection draft-daley-dnsext-host-srv-00.txt", Dec. 31, 2009, 13 pages.
Herzberg et al., "Cipher-Suite Negotiation for DNSSEC: Hop-by-Hop or End-to-End?", IEEE Internet Computing, vol. 19, No. 1, https://www.researchgate.net/profile/Amir_Herzberg/publication/272385849_Cipher-suite_negotiation_for_DNSSEC_Hop-by-hop_or_end-to-end/inks/54ee39730cf2e283086459ec.pdf, 2015, pp. 80-84.
Trusted Automated exchange of Indicator Information. http://taxii.mitre.org/. Accessed Dec. 16, 2014.
Managed Incident Lightweight Exchange (mile). http://datatracker.ietf.org/wg/mile/documents/. Accessed Dec. 16, 2014.

Weimer, Florian, "Passive DNS Replication", Presented at FIRST 2005, http://www.enyo.de/fw/software/dnslogger/first2005-paper.pdf, Apr. 2005, pp. 1-13.
Vixie, Paul, "Passive DNS and ISC SIE", Presented at DNS-OARC Workshop, https://indico.dns-oarc.net/contributionDisplay.py?contribld=4&confid=8, Nov. 2-3, 2007, 10 pages.
Verisign Labs, "New gTLD Security and Stability Considerations", https://www.verisigninc.com/assets/gtld-ssr-v2.1-final.pdf, Mar. 2013, pp. 1-10.
Verisign Labs, "New gTLD Security, Stability, Resiliency Update: Exploratory Consumer Impact Analysis", http://techreports.verisignlabs.com/docs/tr-1140008-1.pdf, Aug. 22, 2013, pp. 1-28.
DNS-OARC, "Domain Name System Operations Analysis and Research Center", https://www.dnsoarc.net/, Accessed Dec. 16, 2014, 3 pages.
Osterweil et al., "Opportunistic Encryption with DANE Semantics and IPsec: IPSECA", Internet-Draft draft-osterweil-dane-ipsec-01, https://datatracker.ietf.org/doc/draft-osterweil-dane-ipsec/, Aug. 28, 2014, pp. 1-19.
Hu et al., "Starting TLS over DNS", Internet-Draft draft-hzhwm-start-tls-for-dns-01, https:// datatracker.ietf.org/ doc/draft-hzhwm-start-tlsfor-dns/, Jul. 4, 2014, pp. 1-12.
Bortzmeyer, S., "DNS Query Name Minimisation to Improve Privacy", Internet-Draft draft-ietfdnsop-qname-mininimisation-00, https://datatracker.ietf.org/doc/draft-ietf-dnsopqname-minimisation/, Oct. 22, 2014, pp. 1-7.
Public Suffix List, https://publicsuffix.org/, Accessed Dec. 16, 2014, 1 page.
Elz at al., "Clarifications to the DNS Specification", RFC 2181, http://tools.ietf.org/html/rfc2181, Jul. 1997, pp. 1-15.
Kumari et al., "Decreasing Access Time to Root Servers by Running One on Loopback", Internet-Draft draft-wkumari-dnsop-root-loopback-00, http://tools.ietf.org/html/draft-wkumari-dnsop-root-loopback-00, Oct. 25, 2014, pp. 1-5.
Lee et al., "How to Scale the DNS Root System?", Internet-Draft draft-lee-dnsop-scalingroot-00.txt, http://tools.ietf.org/html/draft-lee-dnsopscalingroot-00, Jul. 3, 2014, pp. 1-11.
Arends et al., "Resource Records for the DNS Security Extensions", RFC 4034, https://datatracker.ietf.org/doc/rfc4034/, Mar. 2005, pp. 1-29.
ICANN root Server System Advisory Committee (RSSAC), "RSSAC-001: Service Expectation of Root Servers", https://www.icann.org/en/system/files/files/rssac-001-draft-02may13-en.pdf, May 2, 2013, pp. 1-10.
ICANN Root Server System Advisory Committee (RSSAC), "RSSAC-002: RSSAC Advisory on Measurements of the Root Server System", https://www.icann.org/en/system/files/files/rssac-002-measurements-root-20nov14-en.pdf, Nov. 20, 2014, 15 pages.
ICANN, "Identifier Technology Innovation Panel—Draft Report", http://www.icann.org/en/about/planning/strategic-engagement/identifier-technology/report-21feb14-en.pdf, Feb. 21, 2014, pp. 1-52.
VeriSign, Inc., "Comments on Identifier Technology Innovation Panel Draft Report", http://mm.icann.org/pipermail/itipanel/attachments/20140430/361e539a/verisign-commentsiti-panel-2014-04-30-0001.pdf, Apr. 30, 2014.
Information-Centric Networking Research Group (ICNRG), https://irtf.org/icnrg, Accessed Dec. 16, 2014, 4 pages.
About getdns, http://getdnsapi.net/, Accessed Dec. 10, 2014, pp. 1-6.
Trusted Automated exchange of Indicator Information. http://taxii.mitre.org/, retrieved on Nov. 24, 2020, 2 pages.
Managed Incident Lightweight Exchange (mile). http://datatracker.ietf.org/wg/mile/documents/, retrieved on Nov. 24, 2020, 2 pages.
VeriSign, Inc., "Comments on Identifier Technology Innovation Panel Draft Report", http://mm.icann.org/pipermail/itipanel/attachments/20140430/361e539a/verisign-commentsiti-panel-2014-04-30-0001.pdf, Apr. 30, 2014, 4 pages.

* cited by examiner

| Intermediary Capabilities Database | | |
|---|---|---|
| Intermediary | Capability | Features |
| Intermediary-1 | Service Addresses | 1.1.1.1, 2.2. .2.2 |
| | Terms of Service | http://example.net/dns/tos.html |
| | S/W License Agreement | http://example.net/dns/sla.html |
| | DNSSEC | Algorithms: 5,6,7,8,10,13,14 |
| | Privacy | level: 5 |
| | Qname Minimization | |
| | Authentication | Methods: TSIG, SIGO, X.509, Kerberos |
| | Encryption | Methods: STARTTLS |
| | Client Subnet | Scope: /24 |
| | DNS Cookies | None |
| | Transport Protocols | TCP, UOP |
| | Name Collison Mitigation | Persistent, Pipelining |
| | TCP Support Features | |
| | Jurisdictions | US, EU |
| | Reputation | Level 5 |
| | Transparency | Level 2 |
| | Zones Served/Not Served | Not Served: XXX |
| | | |
| Intermediary-2 | Service Addresses | 3.3.3.3, 4.4.4.4, 5.5.5.5 |
| | Terms of Service | http://example.net/dns/tos.html |
| | S/W License Agreement | http://example.net/dns/sla.html |
| | DNSSEC | Algorithms: 5,6, 7,8,10 |
| | Privacy | Privacy level: 3 |
| | Qname Minimization | |
| | Authentication | |
| | Encryption | |
| | Client Subnet | Scope: /32 |
| | DNS Cookies | |
| | Transport Protocols | TCP, UDP |
| | Name Collison Mitigation | |
| | TCP Support Features | |
| | Jurisdictions | JP |
| | Reputation | Level 5 |
| | Transparency | Level 2 |
| | Zones Served/Not Served | Served: COM, ORG, EDU, XXX, |
| [...] | | |

Figure 8

| Authoritative Server Capabilities Database |||
| --- | --- | --- |
| Server | Capability | Features |
| Server-1 | Server Address | 1.1.1.1, 2.2.2.2 |
| | SLA | http://example.net/dns/sla.html |
| | Zones served | example.com |
| | DNSSEC | Algorithms: 8, 13 |
| | Privacy | Level: 5 |
| | Authentication | Methods: TSIG, SIG0, X.509 |
| | Encryption | Methods: STARTTLS |
| | Client Subnet | Scope: /24 |
| | DNS Cookies | |
| | Transport Protocols | TCP, UDP |
| | Jurisdictions | US, EU |
| | Name Collision Mitigation | |
| | TCP Support | Persistent, Pipelining |
| | Reputation | Level: 5 |
| | Transparency | Level: 2 |
| Server-2 | Server Address | 3.3.3.3, 4.4.4.4, 5.5.5.5 |
| | SLA | |
| | Zones served | example.net |
| | DNSSEC | Algorithms: 5 |
| | Privacy | Level: 3 |
| | Authentication | TCP, UOP |
| | Encryption | |
| | Client Subnet | |
| | DNS Cookies | |
| | Transport Protocols | |
| | Jurisdictions | JP |
| | Name Collision Mitigation | Level 5 |
| | TCP Support | TCP, UDP |
| | Reputation | Level: 10 |
| | Transparency | Level: 9 |
| [...] | | |

Figure 9

BALANCING VISIBILITY IN THE DOMAIN NAME SYSTEM

CROSS-REFERENCE TO RELATED APPLICATIONS

This application is a continuation of the co-pending U.S. patent application titled, "BALANCING VISIBILITY IN THE DOMAIN NAME SYSTEM," filed on Feb. 20, 2015 and having application Ser. No. 14/627,506, which claims priority benefit of the U.S. Provisional Patent Application titled, "SYSTEMS AND METHODS FOR BALANCING VISIBILITY IN THE DOMAIN NAME SYSTEM," filed on Dec. 16, 2014 and having Application No. 62/092,474. The subject matter of these related applications is hereby incorporated herein by reference.

FIELD

The present invention relates generally to the systems and methods for resolution of domain names in a domain name system. More particularly, but not exclusively, the present invention relates to a system enabling negotiated terms of service in a domain name system.

BACKGROUND

Resolvers (e.g., recursive name servers) are intermediaries that interface between clients and authoritative name servers in the ecosystem of the Domain Name System (DNS). Resolvers have access to more specific information about individual client behavior than authoritative name servers. One reason for this advantage is that resolvers can act on behalf of a community of users, and send lookup requests to authoritative name servers originating from their own Internet Protocol (IP) addresses, rather than from the IP addresses of the actual clients (although there are situations in which part of a client's IP address can be included in the lookup request). Another reason is that resolvers can maintain caches or databases of previously resolved queries, and can make lookup requests when a cache entry has expired, rather than at a time contemporaneous to the corresponding request from the client. Because of this "filtering" process by resolvers, an authoritative name server can identify general trends about client behavior, but not individual client behavior.

The DNS ecosystem includes millions of resolvers. Some clients interface with a resolver operated by an Internet Service Provider (ISP); others interface with a resolver operated on an enterprise network; and others interface with a public resolver operated as a cloud service. A given resolver's direct information about individual client behavior is generally limited to the clients that interface with that resolver. An authoritative name server, in contrast, has comprehensive information about the overall population of clients, because each client in the overall population ultimately interacts (via some resolver—or in less common cases, directly) with the authoritative name server with respect to a given "zone" of domain names. It follows that general trend information for a zone is available in a more comprehensive way at the zone's authoritative name server than at any given resolver. The trend information is centralized at the authoritative name server (e.g., by the collection of name server instances managed as a single service acting on behalf of this zone).

Individual client behavior, on the other hand, is observable in a more specific way at resolvers than at any given authoritative name server. Moreover, the client behavior observable at a resolver encompasses all zones. However, the observations for the overall population of clients are distributed across the overall population of resolvers (with the exception of those clients that interact directly with the authoritative name servers, for which the resolvers may have no insight at all). Because the global population of resolvers is by design not managed as a single service, resolvers do not automatically obtain comprehensive trend information across all clients, even though they collectively have more visibility into client behavior than do the authoritative name servers.

It is increasingly common that parties in an information technology ecosystem exchange security threat indicators with other parties based on an expectation that a collective defense will be more effective than an individual one. One such information sharing framework is Trusted Automated eXchange of Indicator Information (TAXII), which defines a set of services and exchanges to "enable sharing of actionable cyber threat information across organization and product/service boundaries." A related framework for sharing security incident information is the Managed Incident Lightweight Exchange (MILE).

"Passive DNS" technology is a method for improving the understanding of the state of the DNS by observing the responses that multiple resolvers receive from authoritative name servers. The technology, in its basic form, enables the construction of replicas of the zone files managed by authoritative name servers without the direct involvement of authoritative name server operators or zone administrators. General properties of the zone files, such as the configuration or use of various zones, and some general trends about client behavior, can be made available to researchers through analysis of the responses. In a more advanced form of the Passive DNS technology, sensors deployed across the population of resolvers provide data that can be analyzed for additional purposes, such as insight into security threats via the Security Information Exchange (SIE). This provides further visibility into overall client behavior. In addition to the responses received from authoritative name servers, other information about client behavior can be shared, including real-time information. Passive DNS technology and its enhancements thus enable a collective view of DNS activity at the resolver level.

Operators of authoritative name servers have also developed mechanisms for analyzing general trends to understand both security threats and domain name industry metrics. Based on these mechanisms, for example, Verisign® Labs researchers have analyzed requests to the DNS root zone to understand the potential impact of changes to that zone. This research has provided valuable insight into the risks of "name collisions" where the addition of a proposed top-level domain (TLD) to the root zone may conflict with assumptions made by installed systems that the TLD is not part of the global DNS and can, therefore, be employed privately, e.g., within an enterprise network. Because of established design features of the DNS, requests that include a presumably private TLD are often sent to the authoritative name server for the root zone with the expectation that the response from the root server will be that the TLD does not exist in the global DNS. The addition of such a TLD to the root zone would change the response. Understanding the impact of the change requires an analysis of the general trends of these requests. The more detail available to the root servers, the more insight they can provide into the name collisions and other risks. Authoritative name server operators may also analyze DNS requests in order to understand and thereby balance traffic among multiple service instances; to optimize responses to meet service-level agreements (SLAs); and/or to improve their business operations.

The inventive techniques and concepts described herein use the DNS as an exemplary resolution system, but it is not an exclusive environment wherein the present invention may be applied.

SUMMARY

Embodiments of the present disclosure include a system for negotiating domain name system (DNS) services in a DNS. The system includes an in-band communication channel connecting a first party to a second party. The system also includes one or more out-of-band communication channels connecting the first party to the second party. The first party performs messaging for the DNS services with the second party using the in-band communication channel. Additionally, the first party advertises terms of the DNS service offered by the first party using the one or more out-of-band communication channels Embodiments of the present disclosure also include a method for negotiating DNS services in a DNS. The method includes establishing, by a first party, an in-band communication channel with a second party. The method also includes establishing, by the first party, one or more out-of-band communication channels with the second party. The method further includes advertising, by the first party, terms of the DNS service offered by the second party to the first party using the one or more out-of-band communication channels. Additionally, the method includes performing, by the first party, messaging for the DNS services with the second party using the in-band communication channel based on the DNS service offered using the one or more out-of-band communication channels. Moreover, the method includes establishing an in-band communication channel connecting a first party and a second party. The method also includes establishing one or more out-of-band communication channels connecting the first party and the second party. The method further includes advertising, by the second party, terms of the DNS service offered by the second party to the first party using the one or more out-of-band communication channels. Additionally, the method includes performing messaging for the DNS services between the first party and the second party using the in-band communication channel based on the DNS service offered using the one or more out-of-band communication channels.

Embodiments of the present disclosure further include a method for out-of-band communications between a first party and a second party in the DNS, wherein the first party and the second party perform messaging for DNS resolution using an in-band communication channel. The method includes transmitting, by the first party, a capability set query to the second party. The method also includes receiving, by the first party from the second party in response to the capability set query, a capability set response via an out-of-band communication channel, wherein the capability set response includes a set of features for a DNS resolution connection on the in-band communication channel. The method further includes selecting, by the first party, at least one feature from the set of features for the DNS resolution connection on the in-band communication channel.

BRIEF DESCRIPTION OF DRAWINGS

The foregoing summary as well as the following detailed description is better understood when read in conjunction with the appended drawings. For the purpose of illustrating the invention, the drawings detail exemplary constructions of the invention; however, the invention is not limited to the specific methods and systems disclosed herein.

FIG. 8 shows exemplary capability information of an intermediary in an evolved DNS ecosystem, consistent with the principles of the present disclosure;

FIG. 9 shows exemplary information of an authoritative server in an evolved DNS ecosystem, consistent with principles of the present disclosure.

DESCRIPTION OF EXEMPLARY EMBODIMENTS

In an evolved DNS ecosystem, unilateral decisions of intermediaries (e.g., resolvers or recursive name servers) may limit the visibility to authoritative servers of the queries generated as a result of client behavior, thus limiting the information available for analysis. In accordance with embodiments disclosed herein, a negotiation channel (e.g., a real-time or a near real-time out-of-band channel) is provided between the intermediaries and the operator of the authoritative server. Via the negotiation channel, DNS resolution capabilities, options, and preferences can be communicated between the authoritative server operator and the intermediaries, to obtain a desired level of availability of information for analysis.

Root servers and other authoritative servers obtain information about the general trends of DNS requests as a consequence of the design of the DNS, which requires resolvers and other intermediaries to assume that the administrative authority for a domain name has not been delegated by one authoritative server to another, unless specifically indicated in the response from the first authoritative server. This delegation in the resolution is shown in FIG. 1.

Figure 1:
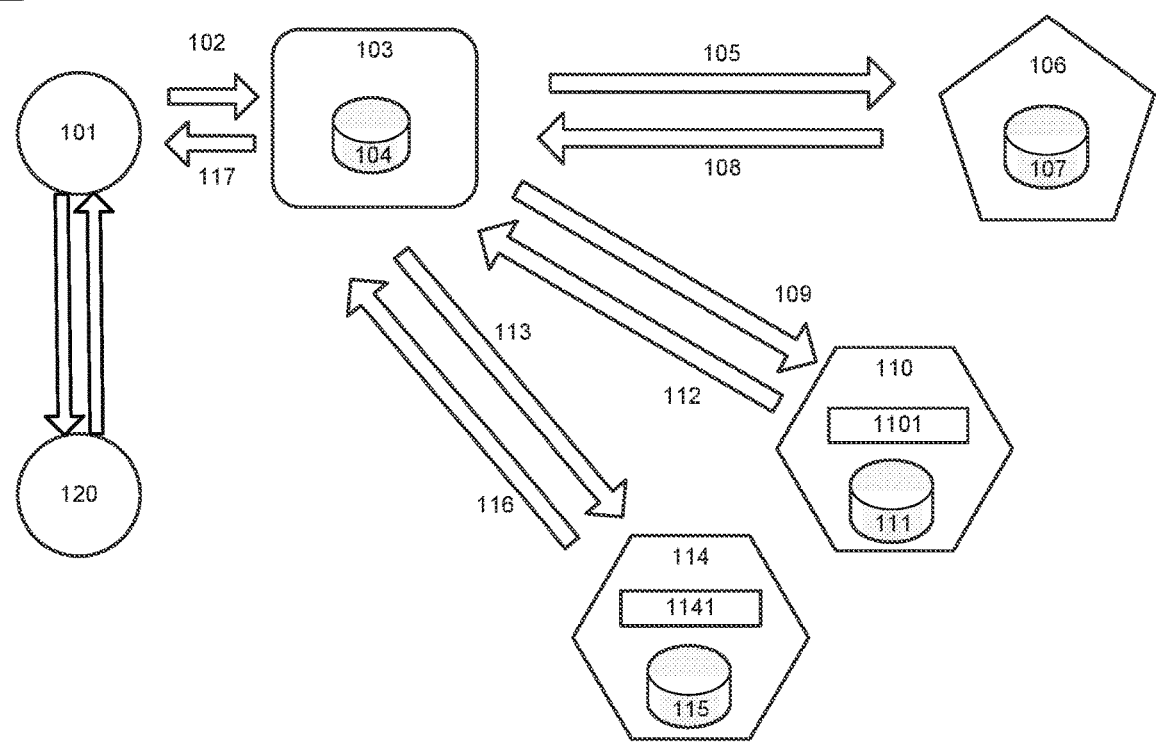
FIG. 1 illustrates an exemplary representation of the DNS and a flow of resolution events in the DNS.

FIG. 1 illustrates an example of a resolution process in a DNS network 100. The DNS network 100 can include a client 101, an intermediary 103, a root server system 106, a TLD 110, and a second-level domain (SLD) 114. For the purposes of the present disclosure, the term "TLD" is interchangeably used to mean "top-level domain," which includes the set of all domain names with a given TLD string as suffix, and to mean a set of servers and resources that handle DNS resolution for the TLD domain. Additionally, for the purposes of the present disclosure, the term "SLD" is interchangeably used to mean "second-level domain," which includes the set of all domain names with a given SLD string as suffix, and to mean a set of servers and resources that handle DNS resolution for the SLD domain. If the client 101 is unable to resolve a name of an entity 120 into an IP address using previously obtained data, then the client 101 can request resolution of the name of the entity 120 by making a query 102 to the intermediary 103 (e.g., a resolver or a recursive name server), which may be associated with the client 101. If the intermediary 103 does not have the queried name in its cache or database 104, the intermediary 103 can, in accordance with the present example, send a query 105 the root server system 106. The root server system 106 can include a distributed network of root servers (e.g., alphabetically designated "A" through "M"). Each such designated root server can be operated with one or more server instances responding to the same IP address, and each of the server instances can be deployed with a copy of a root zone file 107. The intermediary 103 can select one of the designated root servers based on, for example, latency or other measureable criteria, such that the selection may vary over time. A specific instance of the selected root server can be determined by network configuration related to the routing of communications between the intermediary 103 and the IP address of the selected root server.

In the example shown in FIG. 1, the root server 106 examines the root zone file 107 to find DNS record(s) for an authoritative name server 1101 for the TLD 110 associated with the request 105. The root server system 106 returns a response 108 comprising the DNS record(s) to the intermediary 103. The request 105 received from the intermediary 103 may be different than the "original" request 102 sent by the client 101.

The intermediary 103 then sends a request 109 to the authoritative name server 1101 for the TLD 110, where the authoritative name server 1101 is selected based on the DNS record(s) in the response 108. In this example, the authoritative name server 1101 for the TLD 110 processes an SLD portion of the request 109 using zone file 111 and returns the DNS record(s) for the authoritative name server 1141 for the SLD 114 to the intermediary 103 in a response message 112.

Using the obtained DNS record(s) for the authoritative name server 1141 for the SLD 114, the intermediary 103 can send a request 113. The authoritative name server 1141 for the SLD 114 obtains the IP address of the originally requested name of the entity 120 from a zone file 115 of the SLD 114, which can then be sent in a response message 116 to the intermediary 103. The intermediary 103 now has completed name-to-address resolution and passes the result in a response 117 to the client 101. The client 101 can then route messages 120 directly to the entity 120 using the resolved IP address. The client 101 and intermediary 103 may cache the entity name and the resolved IP address for reuse.

As a particular example, the client 101 can look for the IP address associated with the domain name "www.example.com", which can be the name of the entity 120. In the DNS network 100, the client 101 can send a request 102 for the IP address to the intermediary 103 (e.g. a resolver). If the intermediary 103 does not have the answer in a cache, then the intermediary 103 can follow a process, consistent with that illustrated in FIG. 1. Initially, the intermediary 103 can sent request 105 requesting the IP address corresponding to the domain name "www.example.com" to the root server system 106. (Notably, the domain name can include a "." at the end to denote that this it is a fully qualified domain name that it "ends" at the root; however the "." is omitted in the discussion here for simplicity.) In accordance with the present example, the ".com" portion has been delegated to the TLD 110. Accordingly, the root server system 106 can send response 108 with a "referral" to the authoritative name server 1101 for the ".com" zone, which includes DNS record(s) associated with the authoritative name server 1101. Next, the intermediary 103 can send request 109 to the authoritative name server 1101 requesting the IP address for "www.example.com". Because, in accordance with the present example, "example.com" has been delegated to the SLD 114, the ".com" authoritative name server 1101 can send response 112 referring the intermediary 103 to the authoritative name server 1141 for "example.com" in the SLD 114. Next, the intermediary 103 can send request 113 to the authoritative name server 1141 (i.e., the "example.com" name server). In accordance with the present example, the authoritative name server 1141 knows the IP address of the entity 120. Accordingly, the authoritative name server 1141 can send response 116 returning the IP address for "www.example.com" to the intermediary 103. Next, the intermediary 103 can send response 117 including the IP address to the client 102.

In the DNS network 100 illustrated in FIG. 1, the authoritative name servers 1101 and 1141 can see the entire domain name because, within the DNS network 100, any one of the authoritative name servers 1101 and 1141 in the sequence may be the "authority" for the answer and not make referrals to others. A priori, all authority resides in the root server system 106. That is, the root server system 106 includes the authoritative answer for every domain name in the DNS 100 and does not make any referrals. Thus, absent the delegation of authority to any other zone (e.g., TLD 110 or SLD 114), the root server system 106 is the authority for the answer to the IP address for "www.example.com" (if one exists). Furthermore, the root server system 106 may delegate its authority for some "subtrees" of the DNS hierarchy and not for others. For instance, "www.example.com" or "example.com" might be delegated by the root zone to another name server, but the root server system 106 might retain authority for other parts of ".com". Following this example, rather than assuming that all domain names ending with ".com" have been delegated to authoritative name server 1101 of the TLD 110, the intermediary 130 can check with the root server system 106 for a referral by sending the full domain name of the entity 120. Thus, even though in practice, the root server system 106 can return a referral to the authoritative name server 1101 of the TLD 110 in response to request 105 including a domain name ending in ".com" (regardless of the rest of the domain name), the intermediary 103 can continue to send the full "www.example.com" anyway, in case information at the root server system 106 changed. The same pattern applies to the requests sent to the authoritative name server 1101 of the TLD 110 (and, e.g., to the authoritative name servers for other TLDs). Although in practice, the authoritative name server 1101 returns a referral to the "example.com" name server in response to a request ending in "example.com" (because "example.com" has been delegated as an SLD), the intermediary 103 can, nevertheless, continue to send the full "www.example.com."

In other examples consistent with that illustrated in FIG. 1, the intermediary 104 can assume that all domain names ending with a given TLD (e.g., TLD 110) have been delegated to an authoritative name server (e.g., authoritative name server 1101) for that TLD, and then request the root server system 106 for the identity of the TLD name server.

If the TLD doesn't exist, the root server system 106 can return an error message indicating that the TLD does not exist. If the TLD exists, but has not been fully delegated to another authoritative name server, then the root server system 106 can return an error message requesting that the intermediary 103 send the full domain name (or perhaps the next label within it) so that the root server can answer more precisely. In any event, the full domain name of the entity 120 can be sent by the intermediary 103.

Implementation of DNS network 100 consistent with the examples discussed above with regard to FIG. 1 can provide an understanding of security threats and domain name industry metrics, because requests (e.g., requests 105, 109, and 113) including full domain names can provide the authoritative name servers 1101 and 1141 with at least partial information about the trends in client requests. Such information can be valuable in, for example, the analysis of the name collisions issue. The information about domain names can also be valuable in recognizing attack patterns of malware and/or hackers. For instance, if an unusually large number of clients, interfacing with different resolvers (e.g., intermediary 103) request the same domain name, then the requested domain name may be evidence of a distributed denial of service (DDoS) attack. The domain name can also indicate command-and-control communications between clients in a botnet and servers.

Notwithstanding the value of receiving full domain names, the visibility of information about client behavior can also be a potential risk to privacy. For example, the full domain name and other parts of requests sent to a name server, as well as the responses to these requests, may be visible not only to the authoritative name server, but also to parties observing the communications between the intermediary and the authoritative name server.

"Query name minimization" or "qname minimization" techniques attempt to minimize the amount of information used by a name server (e.g., the root server system 106 and other authoritative name servers 1101 and 1141) in DNS network 100. In implementations, query name minimization techniques send only part of the full domain name. For example, only TLD information (e.g., ".com") may be sent to the root server system 106. Alternatively, a "pseudo" domain name may be provided, for instance, where the label "example" or "www" is replaced with a random string. The query name minimization techniques can predetermine delegations of authority that are assumed to have occurred, such as the Public Suffix List that documents DNS "zone cuts."

To the extent that an authoritative name server is relying on observations of full domain names in its analyses, the prospect that some domain names may become obfuscated may make these efforts more difficult. There may not be an actual indicator of which domain names are the full original ones, and which are not. Moreover, the decision to employ minimized domain names can be made unilaterally by a resolver. This is a significant deployment advantage for resolver operators, because it requires no prior negotiation with any other parties. However, the absence of notification also means that the authoritative name server may need to determine on its own that a given resolver is no longer providing full domain names.

In addition, there are techniques that remove queries entirely from the root servers and/or other authoritative name servers and, instead, handle the queries in separate servers. These techniques attempt to reduce latency and increase resiliency. However, these techniques also reduce visibility at the authoritative name servers. The techniques may use DNS Security Extensions (DNSSEC), which enable relying parties to validate DNS records directly, regardless how they are obtained. Many DNS records, such as a substantial portion of a zone file (e.g., the root zone), can carry DNSSEC signatures. In some implementations, the entire zone file may not be signed. For instance, so-called "glue records" that provide hints of records in other zone files may not be signed. But as more data is signed, intermediaries become less dependent on their interaction with authoritative name servers for assurance that DNS records received are authentic; hence DNSSEC provides for the authenticated distribution of portions of zone files by alternative means. For example, a resolver operator may download a signed zone file each time the zone file changes; thereby reducing the need to send further requests to the authoritative name server. Alternatively, or as one part of this technique, a new instance of a root server or another authoritative name server can be set up based on the signed zone file. These are again both changes that can be made unilaterally, provided the signed zone file is public (as is the case for the root zone).

Just as obfuscation of requests reduces their value for security analysis at the authoritative name server, omission of requests does so even more. Thus, using "alternative roots" and similar techniques reduces the insight otherwise available to authoritative name servers. Root server operators, recognizing the importance of sharing information about security threats and operational issues, have begun to establish best practices for root server instrumentation and operations (e.g., RSSAC001 and RSSAC002). Other proposals involve alternative means of distributing the root zone and other zones. This increased attention to information sharing among root server operators is, thus, an additional motivation for maintaining a balance with changes that could reduce root servers' visibility.

Information-centric networking (ICN) architectures are another technique for distributing zone files and DNS records from authoritative name servers. For instance Named Data Networking (NDN), "routes" data across the Internet based on its name. An intermediary or other party can "request" the DNS records associated with a given domain name through such a network, and the response (which can be authenticated with a digital signature) can be returned by a node that already has it, without necessarily involving an authoritative name server. This technique has advantages for latency and resilience; however it also reduces the visibility of client behavior to authoritative name servers.

As noted above, some clients interact directly with authoritative name servers, without using an intermediary. Such a practice may become more common as a result of new programming interfaces available to clients that provide more effective access to DNS records, and in particular to DNSSEC validation (e.g., getdns api). This may increase authoritative name servers' visibility into client behavior, in the long term, trends such as information-centric networking just mentioned—potentially facilitated by DNSSEC—may again reduce the visibility.

The set of requests that an authoritative name server processes is already diverse, representing both "normal" Internet traffic as well as traffic resulting from misconfigurations, errors and attacks (which often can be much larger than the "normal" background). The analysis must adapt to unusual behavior within the normal traffic, as well as intentional attempts to obscure analysis within the attack traffic. However, it would be desirable if intentional changes not associated with attacks (including the examples mentioned above) can be done in a way that maintained a balance with the visibility into general trends that was previously possible. Accordingly, a method is needed that enables both the improvements in privacy, latency, resiliency, and other attributes that are being pursued in current efforts, while maintaining and preferably enhancing insight into security threats, domain name industry metrics, and client behavior more generally.

Figure 2:
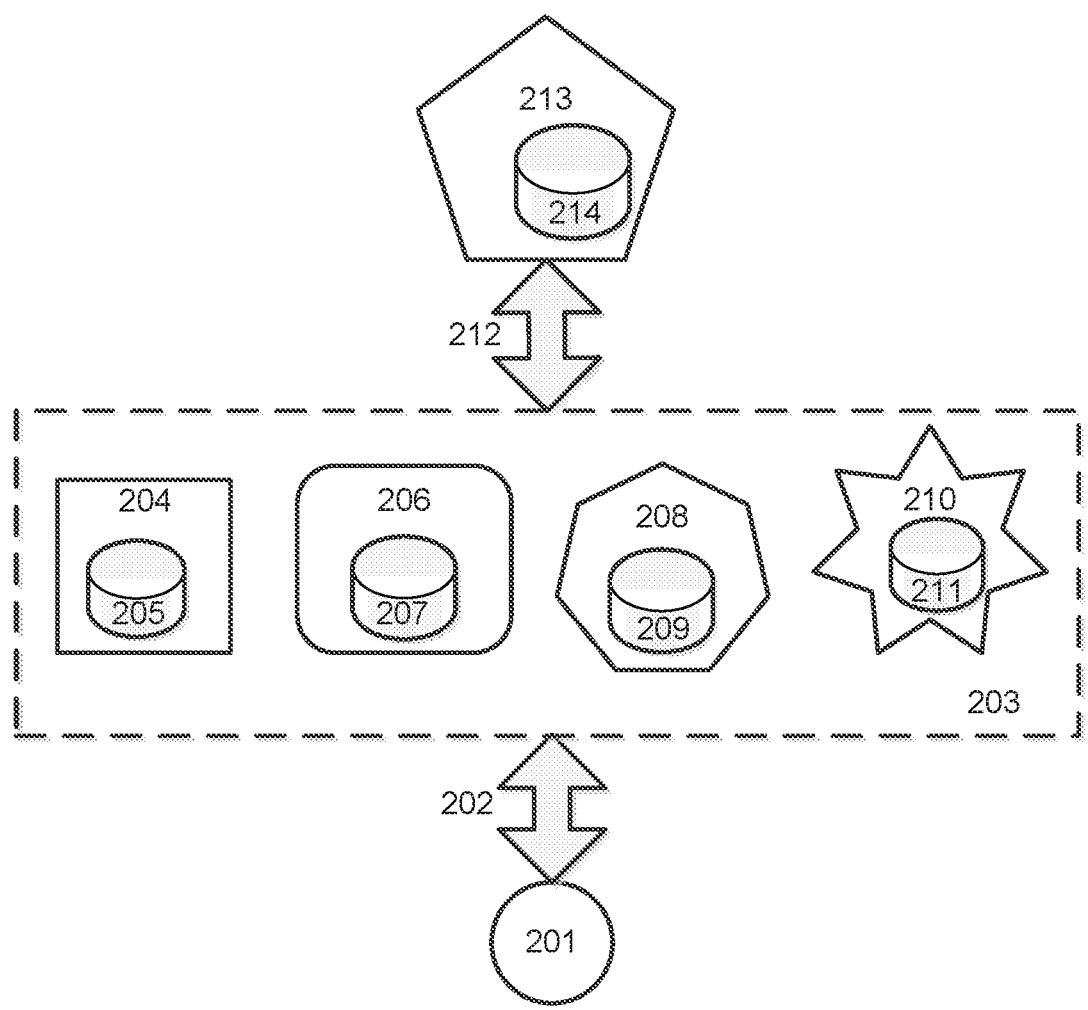
FIG. 2 shows an example of an evolved DNS ecosystem with multiple types of intermediaries deployed in the DNS ecosystem, consistent with principles of the present disclosure.

FIG. 2 shows an example of an evolved DNS ecosystem 200 in accordance with aspects of the present disclosure. DNS ecosystem 200 includes a client 201 (e.g., a personal computer, a mobile telephone, etc.), multiple types of intermediaries 203, and a root server 213, which may be the same or similar to those previously discussed (e.g., client 101, intermediary 103, and root server system 106).

In accordance with some embodiments of the present disclosure, the client 201 may access any or all of the intermediaries 203 over digital communication channels 202. A recursive resolver 204 can gradually build an incomplete copy of a zone file 214 (e.g., zone file 104) managed by the root server 213 (e.g., in root server system 106) into a resolver database 205 as it services DNS requests from various clients over time. A second type of intermediary, pre-loaded resolver 206 can also function as a resolver. However, the pre-loaded resolver 206 has a full or partial copy of the zone file 214 loaded into the local database 207 at startup, and/or updated from time to time. A third type of intermediary is alternative root server 208. The alternative root server 208 possesses its own alternative database 209. The alternative database 209 can contain a copy of the root zone file 214 following industry standards and accepted practice. However, embodiments of the present disclosure are not limited by this requirement; the alternative database 209 need not match the root zone file 214. A fourth type of intermediary is an information-centric networking (ICN) node 210. The node 210 can obtain DNS records from the root server 213 either directly or indirectly (possibly via other ICN nodes) and store them in its database 211. The node 210 can route the records to the client 201 either directly or indirectly (possibly via other ICN nodes) as needed according to the interests of relying parties.

The intermediaries 203 may communicate with the root server 213 over digital communication channels 212. These communications can include resolution requests and responses. In the case of the pre-loaded resolver 206 and the alternative root server 208, the communications can include periodic or ad hoc downloads of the root zone file 214. Alternatively, downloads of the root zone file 214 can be obtained via a separate server (not shown) that has a copy of the root zone file 214 and manages the download service.

Resolution traffic may be communicated via connectionless User Datagram Protocol (UDP) in both the request and response directions, and/or via the connection-oriented Transmission Control Protocol (TCP). Due to the proliferation of denial-of-service (DoS) attacks and increasing response sizes, including the effect of increasing key sizes in the DNSSEC, TCP is expected to become increasingly used in both the client-to-intermediary communication channel 202 and the intermediary-to-root-server communication channel 212. The invention is not limited to either or to both protocols.

Figure 3:
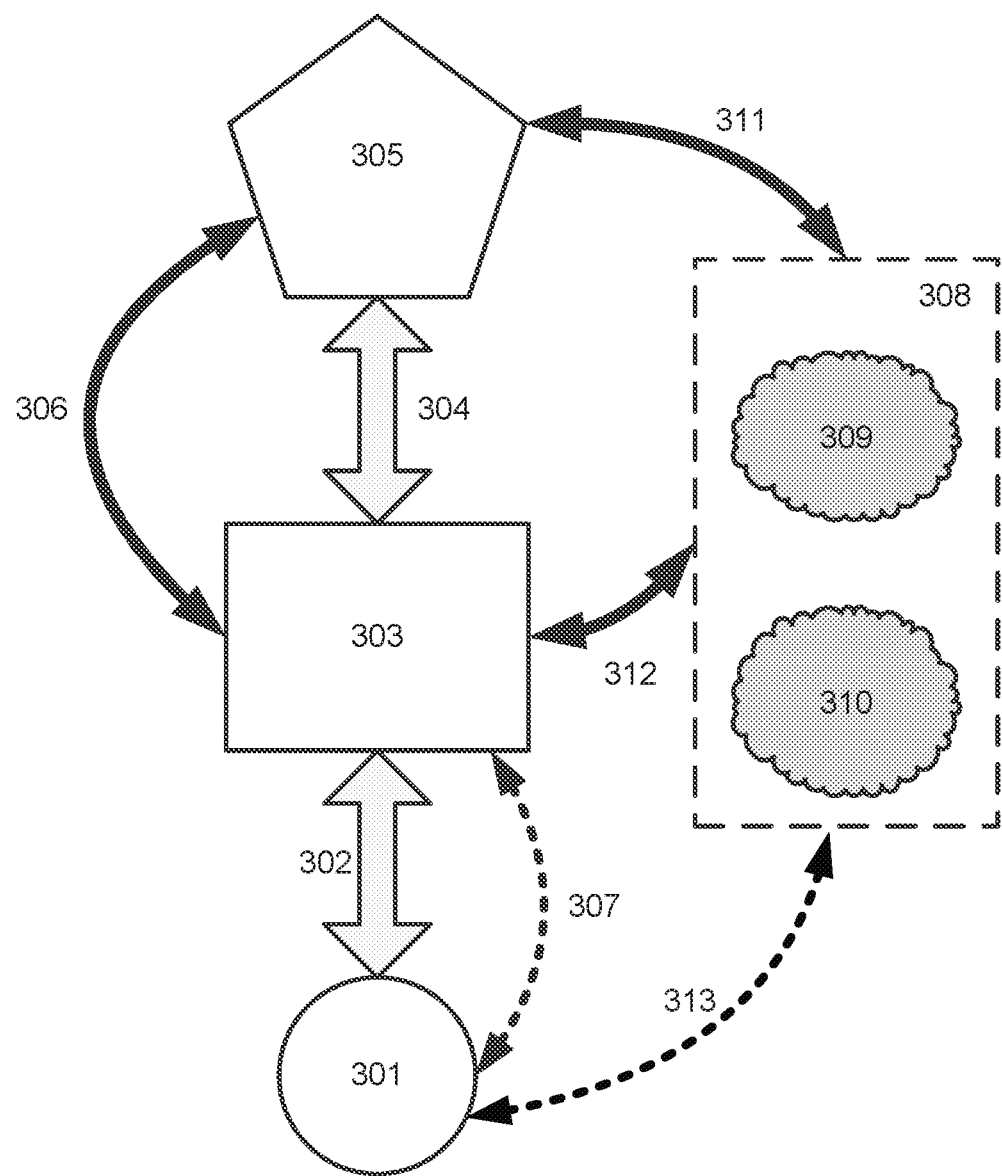
FIG. 3 is a block diagram of an example of an evolved DNS ecosystem with in-band and out-of-band communications, consistent with principles of the present disclosure.

FIG. 3 shows an example of an evolved DNS ecosystem 300 with "in-band" and "out-of-band" communications in accordance with embodiments of the present disclosure. "In-band" refers to the request and response messaging required for resolution of DNS queries. In embodiments, the in-band communications can exchange information in messages using DNS communication protocols that are not used by the out-of-band communications. Additionally, in embodiments, in-band communication use persistent communication channels.

"Out-of-band" refers to auxiliary negotiations between e.g., clients, root servers and intermediaries, as well as to other services, information exchanges and data repositories. In embodiments, the out-of-band communications exchange information messages using messaging protocols that are different than those used by the in-band communications. For example, the out-of-band communications perform information exchange using a messaging format that is not required for DNS resolution. Additionally, in embodiments, the out-of-band communications may perform information exchange using a messaging format that is insufficient DNS resolution purpose (e.g., based on numbers, sizes, and/or arrangement of data frames). Further, the out-of-band communications my uses data channels that are different and/or separate than data channels used for in-band communications. Moreover, in embodiments, out-of-band communications use non-persistent communication channels that are initiated and terminated on an ad hoc basis. The auxiliary negotiations performed using out-of-band communication may be performed in real-time or near real-time, or they may be performed on a periodic or occasional basis. In some embodiments, the out-of-band communications may involve a separate server or servers from the ones involved with the in-band communications. For example, a root zone operator may operate one server (typically with multiple instances) for in-band services, and a separate, though coordinated, server (again typically with multiple instances) for out-of-band services.

The example DNS ecosystem 300 includes a client 301, intermediaries 303, and a root server 305, which communicate over in-band communication channels 302 and 304. The client 301, the intermediaries 303, the root server 305, and the communication channels can be the same or similar to those previously discussed herein (e.g., client 201, intermediaries 203, root server 203, and digital communication channels 202, 212). Additionally, in accordance with embodiments of the present disclosure, the DNS ecosystem 300 includes one or more out-of-band services 308 and one or more out-of-band communication channels 306, 307, 311, 312, and 313. Notably, although FIG. 3 depicts the out-of-band communications 306, 307, 311, 312, and 313 separately from the communication channels 302 and 304, in some embodiments, the out-of-band communications may use the same the channels 302 and 304 (e.g., the same physical communication channel or the same logical communication channel as the in-band communications. In other embodiments, however, the out-of-band communications and the in-band communications can use different, incompatible messaging protocols and/or different, separate communication channels.

In accordance with aspects of the present disclosure, the intermediaries 303 can include various types of intermediaries, including recursive resolvers (e.g., recursive resolver 204), pre-loaded resolvers (e.g., pre-loaded resolver 206), alternative root servers (e.g., alternative root server 208), and/or ICN nodes (e.g., ICN node 210). The intermediaries 303 can communicate with the client 301 over in-band communication channel 302, and the root server 305 can communicate with the intermediaries 303 via in-band communication channel 304. In embodiments, the in-band communication channels 302 and 304 are persistent channels that, for example, facilitate authentication and encryption between the client 301, the root server 305, and the intermediaries 303.

Additionally, the intermediaries 303 can communicate with the root server 304 and the client 301 via the out-of-band communications channels 306 and 307 respectively. For example, the intermediaries 303 can use the out-of-band communication channel 307 with the client 301 to indicate which DNS resolution capabilities, options, and preferences the intermediaries 303 may have negotiated with authoritative name servers (e.g., authoritative name servers 1101 and 1141) as part of a decision by the client to select one of the intermediaries 303, and/or as part of the client's 301 negotiation with the intermediaries 303.

Further, the root server 305 can communicate with the intermediaries 303 via the out-of-band communication channel 306. Out-of-band communication channels 306 and 311 can be used to negotiate terms of service (e.g., capabilities having associated features). The terms of service can include, for example, messaging protocols supported (e.g. UDP, TCP/IP, et al.), channel provisioning, authentication, encryption, resolution prioritization, resolution latency allowed, qname minimization options, zones served, zone file download options, zone and alternative database versions, reputation, trust lists, and the like.

Moreover, in accordance with aspects of the disclosure, the client 301, the intermediaries 303, and/or the root server 305 can communicate with the out-of-band services 308 via the out-of-band communication channels 311, 312, 313, which connect the client 301, the intermediaries 303, and/or the root server 305 via one or more of the out-of-band services 308. Using the out-of-band communication channels 311, 312, 313, the client 301, the intermediaries 303, and/or the root server 305 can transfer registration information, capability information, service information and/or summary analyses or other DNS services information on a pull or push basis with the out-of-band services 308.

In embodiments, the out-of-band services 308 can include information repositories/exchanges 309 and other negotiated services 310. For example, the repositories/exchanges 309 and other negotiated services 310 can include online payment services or crypto-currency exchanges (e.g., Bitcoin) to allow for financial remuneration for out-of-band services, in-band services (e.g., resolution traffic), or information/data can be delivered. Additionally, the repositories/exchanges 309 and other negotiated services 310 can include computing, storage or communications services so that remuneration can be delivered in the form of technology services and/or data. Further, in embodiments, the negotiated services 310 can negotiate features from the intermediaries 303 and/or repository/exchange 309 on behalf of the client 301 via the out-of-band communication channels 311, 312 and 313. Further, in embodiments, the negotiated services 310 can negotiate features from the root server repository/exchange 309 on behalf of the intermediaries 303 via the out-of-band communication channels 311, 312 and 313.

In an exemplary implementation in accordance with aspects of the disclosure, the intermediaries 303 include a plurality of recursive DNS servers (e.g., types of resolvers). In embodiments, the client 301 and the intermediaries 303 can use the out-of-band communication channel 307 to negotiate the selection of one of the recursive DNS servers based on preferences of the client 301 for DNS service capabilities. The DNS service capabilities can include, for example, reputation, transparency, DNSSEC support, qname minimization, privacy guarantees (e.g. whether or not query logs are retained, and if so what the retention periods and sharing constraints are present), authentication and encryption capabilities, DNSSEC validation, use of the EDNS client subnet feature, use of DNS cookies, support for persistent TCP connections and pipelining, name collisions mitigation support, government jurisdiction, malware filtering, cost and payment options, etc., and the like. For example, each of the recursive DNS servers can use the out-of-band communication channel 312 to register its identifying information (e.g., IP address) with the information repositories/exchanges 309 and submit capability information. The capability information can be the same or similar to the types of DNS service features in the client's preferences. The client 301, via the out-of-band communication channel 313, can communicate with the information repositories/exchanges 309 and request registered recursive DNS servers that satisfy the DNS service features included in the preferences of the client 301. In response, using the out-of-band communication channel 313, the information repositories/-exchanges 309 can send the client that identification and the capability information of registered DNS servers the meet or exceed the DNS service features included in the preferences of the client 301. Based on a comparison of the information capability information with the DNS service features included in the preferences of the client 301, the client can select one of the recursive DNS servers. For example, the client can select a particular one of the DNS servers having the greatest number of capabilities that exceed the features included in the preferences of the client 301. By selecting a recursive DNS server in the above-described process, the evolved DNS ecosystem 300 in accordance with embodiments disclosed herein advantageously provides a process by which recursive DNS servers can compete to service the client 301 based on offered features and capabilities.

Although in the foregoing, element 301 is described as a client, it is understood that in embodiments consistent with the present disclosure, element 301 can be a broker acting on behalf of one or more user devices, which are themselves clients of intermediaries 303. Additionally, while element 303 is described above as intermediaries, it is understood that in embodiments consistent with the present disclosure, element 303 can be a broker acting on behalf of one or more intermediary devices.

Figure 4:
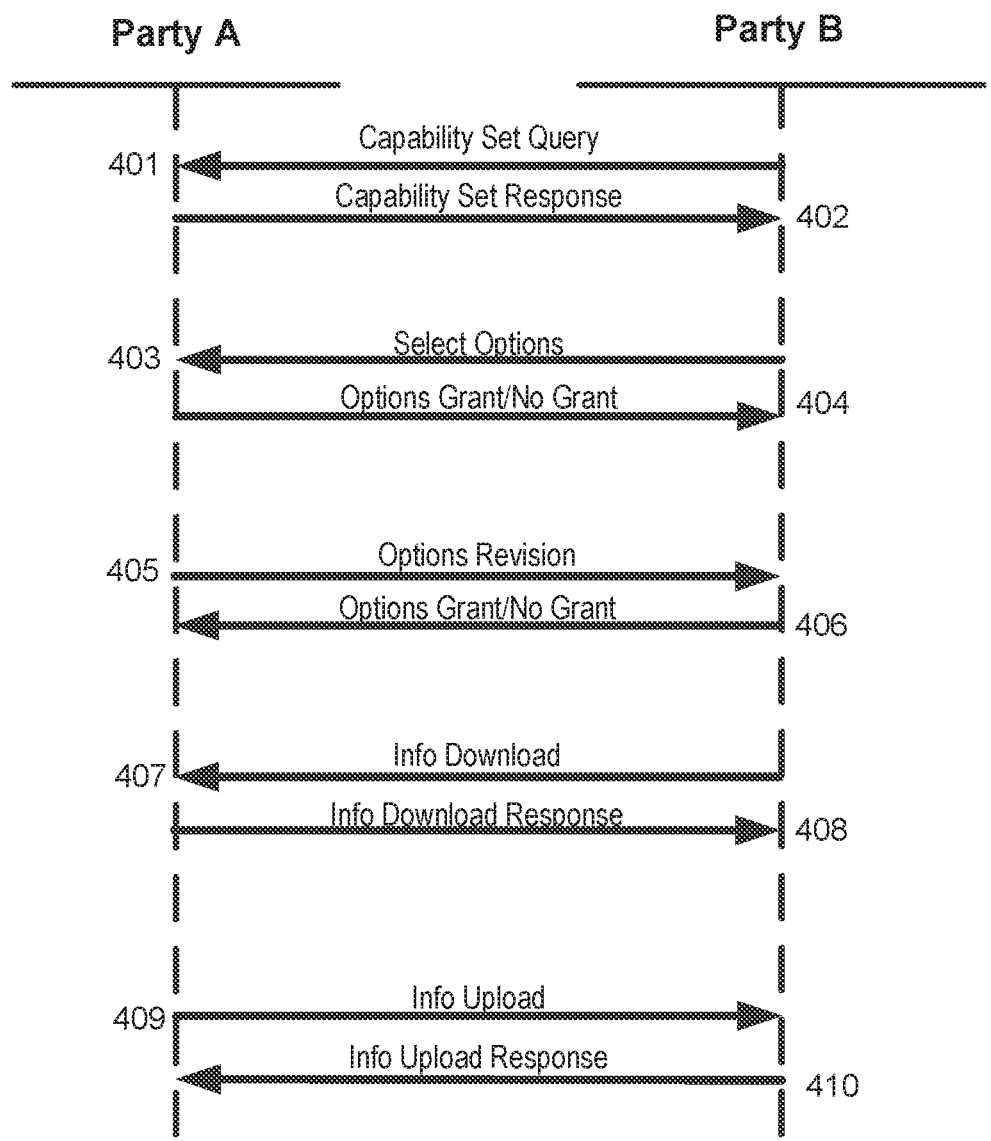
FIG. 4 depicts an exemplary messaging process for the out-of-band communications between two parties in an evolved DNS ecosystem, consistent with principles of the present disclosure.

In accordance with embodiments consistent with the present disclosures, FIG. 4 depicts an example of messaging for the out-of-band communications between a party A and a party B in a DNS ecosystem, in accordance with aspects of the present disclosure. In embodiments, party A can be upstream of party B in the DNS ecosystem. For example, party A can be an authoritative server and party B can be an intermediary. In other embodiments, party A can be an intermediary and party B can be a client. The authoritative server, the intermediary, and the client may be the same or similar to those previously described herein (e.g., root server 305, intermediaries 303, and client 301). In some implementations, the authoritative server and the intermediary may be separate from, but coordinated by the respective operators of in-band services, which may be the same or similar to those previously discussed herein.

The messaging shown in FIG. 4 can include, but is not limited to, a capability set query 401, a capability set response 402, a select options message 403, a options grant/no grant message 404, an options revision message 405, an options grant/no grant message 406, an info download (e.g., info request) message 407, an info download response message 408, an info upload (e.g., info escrow) message 409, and an info upload response message 410.

The capability set query 401 is designed so that party B may ask party A for a set of optional, recommended and/or mandatory features of the in-band resolution connection(s).

The capability set response 402 details party A's elections for and/or compliance with the features. Additionally or alternatively to the negotiation of features using these messages, or the like, can be the use of a separately published list of optional, recommended and/or mandatory features of the party A, allowing the second party to select the party A and/or elect features without negotiation.

The select options message 403 allows party B to update to the selected optional and/or recommended feature set once selected. Party A may allow or disallow the changes using the options grant/no grant message 404.

The options revision message 405 can be used by party A to send party B revisions to the offered optional, recommended, and/or mandatory feature set(s) previously offered. Party B can use the options grant/no grant message 406 to acknowledge the offering and show its election or non-election of the offered features.

The info download (e.g., info request) message 407 can be used by party B (e.g., an intermediary) to obtain summary analyses of DNS requests and responses from party A (e.g., an authoritative server), or credentials for accessing such information or demonstrating that such information has been stored in an out-of-band information exchange or repository (e.g. the information repository/exchange 309) from party A. The summary analyses may relate to DNS requests and responses processed by party A and/or to DNS requests and responses processed by other authoritative servers and/or intermediaries. The message may also be used to obtain a copy of the root zone file. Party A uses the info download response message 408 to deliver the information. In various embodiments, the type and content of information to provide may be set beforehand in the capability set messaging 401, 402 or the options revision messaging 405, 406.

The info upload (e.g., info escrow) message 409 can be used by party A to obtain summary analyses of DNS requests and responses from party B, or credentials for accessing such information or demonstrating that such information has been stored in an out-of-band information exchange or repository (e.g. the information repository/exchange 309). The summary analyses may relate to DNS requests and responses processed by party B and/or to DNS requests and responses processed by other intermediaries and/or authoritative servers. Party B can use the Info Upload Response message 410 to deliver the information. The type and content of information was previously set in the capability set messaging 401/402 or the options revision messaging 405/406.

Figure 5:
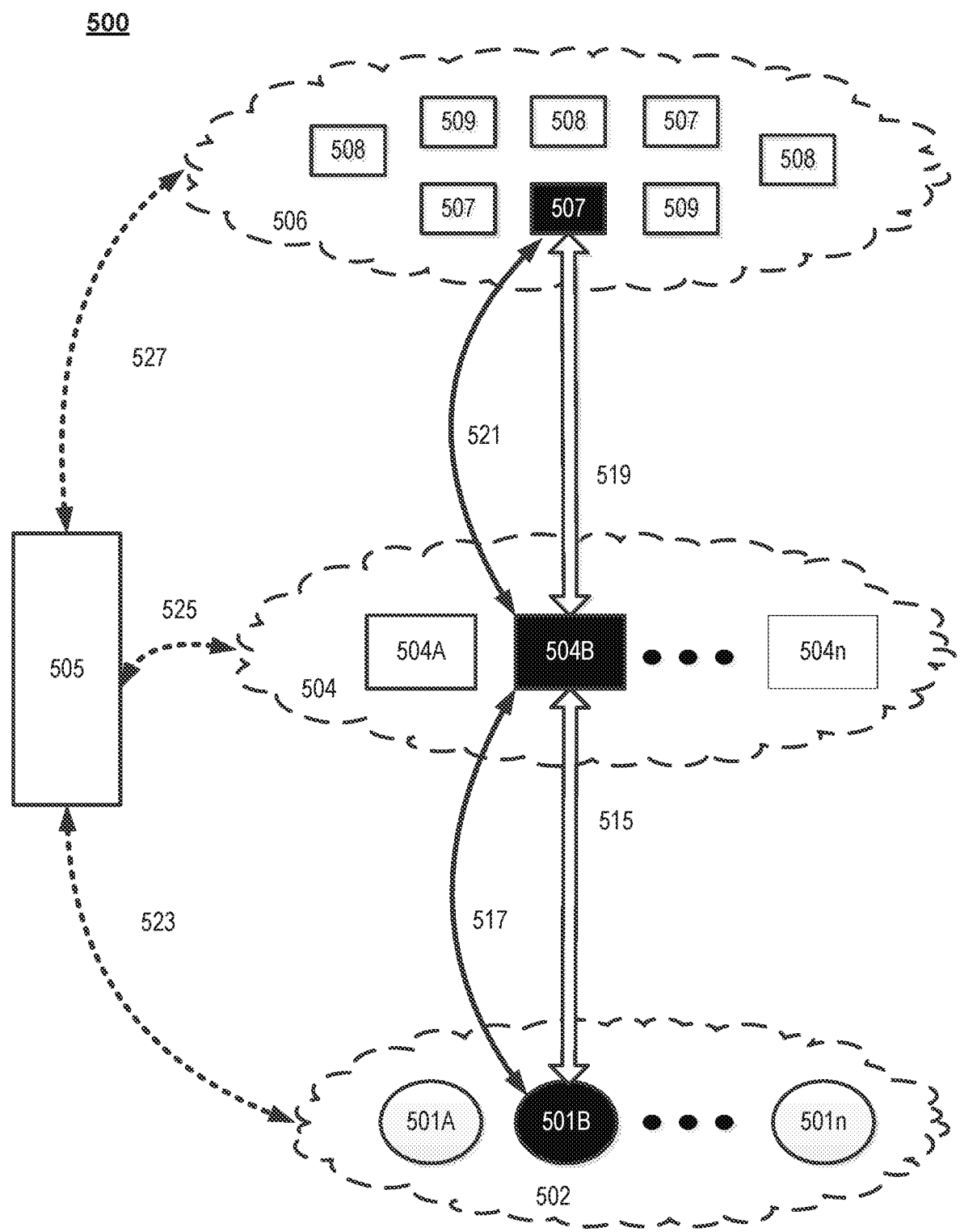
FIG. 5 shows an example of an evolved DNS ecosystem, consistent with principles of the present disclosure.

FIG. 5 shows an example of the evolved DNS ecosystem 500 consistent with aspects of the present disclosure. In embodiments, the evolved DNS ecosystem 500 includes one or more clients 501A . . . 501n in a pool 502, one or more intermediaries 504A . . . 504n, a repository 505, and a pool of servers 506. The pool of servers 506 can include root servers 507, alternative root servers 508, and/or name servers 509 (e.g., authoritative name servers 1101 and 1141). The clients 501A . . . 501n can communicate with the intermediaries 504A . . . 504n via in-band channel 515 and out-of-band channel 517. The intermediaries 504A . . . 504n can communicate with the servers 507 . . . 509 via one or more in-band channels 519 and one or more out-of-band channels 521. Additionally, in embodiments, the clients 501A . . . 501n, the intermediaries 504A . . . 504n, the repository 505 and/or the servers 507 . . . 509 can communicate with the repository 505 via one or more out-of-band communication channels 523, 525, 527. Further, the clients 501A . . . 501n, the intermediaries 504A . . . 504n, the servers 507, 508, 509, and/or 510, the in-band communication channels 515, 519, and the out-of-band communication channels 517, 521, 523, 525, and 527 can be the same or similar to those previously described herein.

Client 501B may require service while communicating over a variety of communications protocols (e.g., IPv4, IPv6, UDP, TCP, and the like) and using a variety of formats (e.g., textual DNS names, images, audio voice, QR codes, and the like). In accordance with embodiments of the present disclosure, the client 501B can select a one of the intermediaries 504A . . . 504n (e.g., a resolver, recursive name server, and the like) to interact with based on negotiable terms of service advertised by some or all of the intermediaries 504A . . . 504n using out-of-band communication channel 517. For example, the client 501B can select the intermediary 504B based on advertised messaging protocols supported (e.g. UDP, TCP/IP, et al.), channel provisioning, authentication, encryption, resolution prioritization, resolution latency allowed, qname minimization options, zone file download options, and the like. Additionally, the client 501B can select the intermediary 504B based on latency or other measurable criteria of each intermediary 504A . . . 504n in the evolved DNS network 500.

In accordance with embodiments of the present disclosure, the intermediary 504B can select one or more of the pool 506 of root servers 507, alternative root servers 508, and/or authoritative name servers 509 to interact with. In embodiments, the selection of one or more of the servers 507, 508, 509, and/or 510, parameters, and protocols, which uses in-band communication channel 519, is based on the negotiable terms of service advertised via out-of-band communication channel 521 (such as previously disclosed herein) with the servers 507, 508, 509, and/or 510 in the pool 506 or using out-of-band services provided by repository 505.

It is understood that the example embodiments shown in FIGS. 2-5 encompass negotiations between an intermediary (e.g., intermediary 504B) and an authoritative servers (e.g., root servers, name servers, etc.). Moreover, the example embodiments can also be applied to an interaction between an intermediary (e.g., intermediary 504B) and other intermediaries (intermediaries 504A . . . 504n) which can operate as name servers (e.g., recursive name servers) or with respect to negotiated terms. For example, in embodiments, intermediaries can communicate with other intermediaries (via in-band and/or out-of-band communication channels) to share information regarding root selection, to determine whether to go out of band, and to perform other communications discussed previously herein. Further, as previously discussed, the example embodiments can be applied to interactions between a client (e.g., client 501B) and a resolver, recursive name server, or other intermediary (e.g., intermediaries 504).

In embodiments, "authoritative name server operator" can refer to the single entity responsible for the operation of an authoritative name server (which can have multiple instances). However, in the case of the authoritative operator of the root zone, there are multiple independent operators and the term "authoritative name server operator" may refer to any one of these operators, and the terms of service may be negotiated separately for each one. It is understood that the underlying service provided by each server operator (e.g., serving the global DNS root) may be the same, and the operators may all meet or exceed the same minimum required terms of service, without limiting the operators from offering different features or services above and beyond these requirements. Furthermore, in the general case where there is a single operator of the multiple authoritative name servers for a given zone, the different name servers may have different service attributes.

In some embodiments discussed previously, the clients 501A . . . 501n can communicate directly with a particular one of intermediaries 504A . . . 504n (e.g., intermediary 504B) to negotiate features. However, in accordance with aspects of the present disclosure, the clients 501A . . . 501n (e.g., as represented by stub resolvers interface between the clients 501A . . . 501n and the global DNS) can negotiate with the intermediaries 504A . . . 504n to select one of the servers 507, 508, 509, and/or 510 based on predefined preferences for specific capabilities and/or features. For example, the servers 507, 508, 509, and/or 510 can use out-of-band channel 527 (e.g., which can be the same or similar to out-of-band channel 312) to register and submit respective capability and/or feature information to the repository 505 (e.g., which can be the same or similar to information repositories/exchanges 309 and/or negotiated services 310). The clients 501A . . . 501n can use the out-of-band channel 523 (e.g., which can be the same or similar to out-of-band channel 313) to request a list identifying which of the servers 507, 508, 509, and/or 510 satisfy a set of capabilities and/or feature set required by the client. The features and/or capabilities can include reputation within the DNS ecosystem 500, transparency, DNSSEC support, qname minimization, certain types of privacy guarantees (e.g. whether or not query logs are retained, and if so what the retention periods and sharing constraints are present), authentication and encryption capabilities, DNSSEC validation, use of the extension mechanisms for DNS (EDNS) client subnet feature, use of DNS cookies, support for persistent TCP connections and pipelining, name collisions mitigation support, government jurisdiction, malware filtering, cost, and payment options, etc. For example, the client 501B can send a ranked list of capabilities and/or features, each of which can be tagged as optional or mandatory, to the repository 505 via out-of-band communication channel 53. In response, the repository 505 compares records or capabilities and/or features provided to the repository 505 by intermediaries 504A . . . 504n and returns to the client 501B a ranked list of intermediaries 504A . . . 504n providing resolver services that satisfy the list of the client 501B. Based on the ranked list received from the repository 505, the client 501B can select the best one of intermediaries 504A . . . 504n included in the list, or optionally present the list to a user for explicit selection.

Although FIG. 5 shows a single repository 505, it is understood that DNS ecosystem 500 could include multiple repositories 505, which could be managed in a centralized, a decentralized, a distributed, or a hierarchical structure. The selection of a particular repository 505 from several such repositories could be predefined (e.g., hardcoded) into the clients 501A . . . 501n. For example, the selection could be configurable by user, or provided to the user as part of a network configuration. Furthermore, to access a particular repository 505 within DNS ecosystem 500, the clients 501A . . . 501n could be provided with a predefined address the client would need to know to reach the repository. Additionally, the clients 501A . . . 501n could dynamically learn the address as part of a network initialization process (e.g., the address could be delivered by the network operator via a DHCP or DHCPv6 option or via a Router Advertisement option).

Repositories of resolver capabilities can have a beneficial effect on the overall ecosystem by creating an environment where public resolvers compete for clients based on offered features and capabilities. They may also be helpful to authoritative name servers in understanding the characteristics of the resolvers that send queries to them. Similar repositories can also be employed in private environments, e.g., within an enterprise, private cloud, or other closed network (one not generally accessible to the public) to enable clients within that environment to select among a catalog of resolvers.

Figure 6:
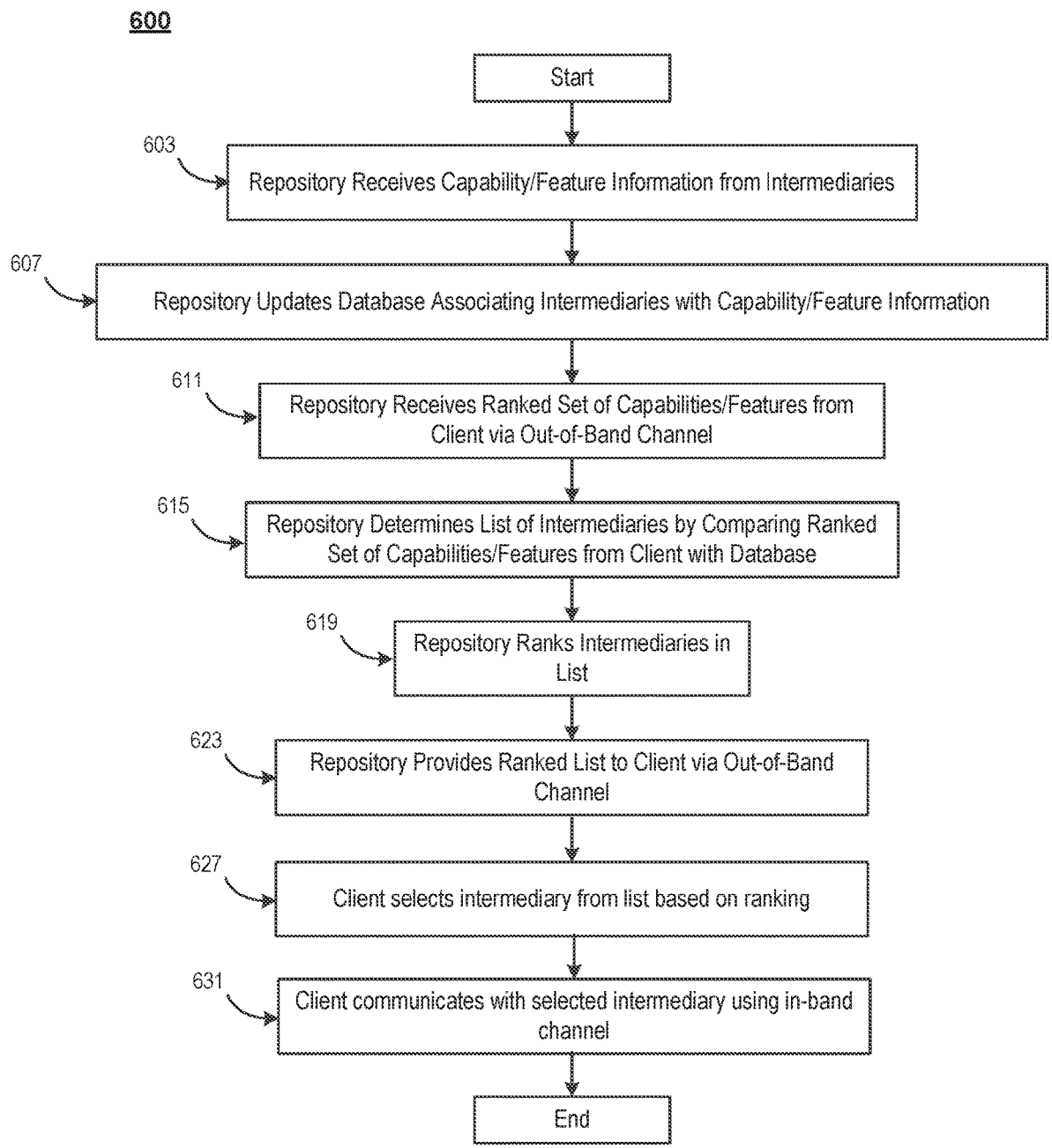
FIG. 6 shows an exemplary process for selecting an intermediary by a client, consistent with principles of the present disclosure.

FIG. 6 shows an exemplary process 600 for selecting an intermediary by a client based using out-of-band communications in accordance with embodiments of the present disclosure. At 603, a repository (e.g., repository 505) receives identification and capability information from one or more intermediaries (e.g., intermediaries 504A . . . 504n) in a DNS ecosystem (e.g., DNS ecosystem 500) via an out-of-band communication (e.g., out-of-band channel 525). The capabilities can include those previously described herein. For example, the capabilities can include information describing one or more of the following: server addresses, software license agreements, zone policies, DNSSEC policies, privacy policies, authentication policies, encryption policies, client subnet support, DNS cookies, transport protocols, jurisdictions served, name collision mitigation policies and TCP support policies. The capabilities may be associated with one or more features discussed previously herein. For example, a particular intermediary may only service particular DNS zones, and a zones service feature defined in the capability set of that intermediary may whitelist and/or blacklist one or more DNS zones. The DNSSEC policy may define DNSSEC algorithms used by an intermediary. The privacy policy may define a privacy level provided by an intermediary using a value from a standard range (e.g., 1-10, where 1 is the weakest and 10 is the strongest). The authentication policy may define one or more authentication methods used by an intermediary. The encryption policy may define one or more encryption methods used by an intermediary. The client subnet support may define one or more subnet scope values used by an intermediary. The DNS cookies may define one or more cookies used by an intermediary. The transport protocols may define one or more transport protocols used by an intermediary. The jurisdiction may define one more jurisdictions (e.g., US, EU) governing the operations of and/or served by an intermediary. The name collision mitigation may define one or more name collision mitigation techniques used. TCP support policies may define techniques (e.g., persistent, pipelining) for interacting with by an intermediary.

At 607, the repository updates a database with records that associate the identifiers of the intermediaries with their respective capabilities. For example, the database can store a record corresponding to each of the intermediaries. At 611, the repository receives a ranked set of capabilities and features from a client (e.g., client 401B) via an out-of-band channel (e.g., out-of-band channel 523). The ranked set of capabilities can include, for example, a DNSSEC policy type, a privacy policy level, a transport protocol, and a jurisdiction of the client. At 615, the repository determines a list of the intermediaries that meet the set of capabilities and features received from the client based on the information stored in the database at 607. At 619, the repository can rank the list of intermediaries determined at 615 based on the set of capabilities received from the client at 611. For example, repository may give the highest ranking to an intermediary that provides the greatest level of privacy with respect to the other intermediaries in the list. At 623, the repository provides the ranked list determined at 619 to the client via an out-out-band channel (e.g. out-of-band channel 523). At 627, the client selects one of the intermediaries from the list provided at 623. In embodiments, the client may automatically select the highest ranked intermediary. In other embodiments, a user at the client selects an intermediary from the list. At 631, the client communicates with the intermediary selected at 627 using an in-band channel (e.g., in-band channel 515).

Figure 7:
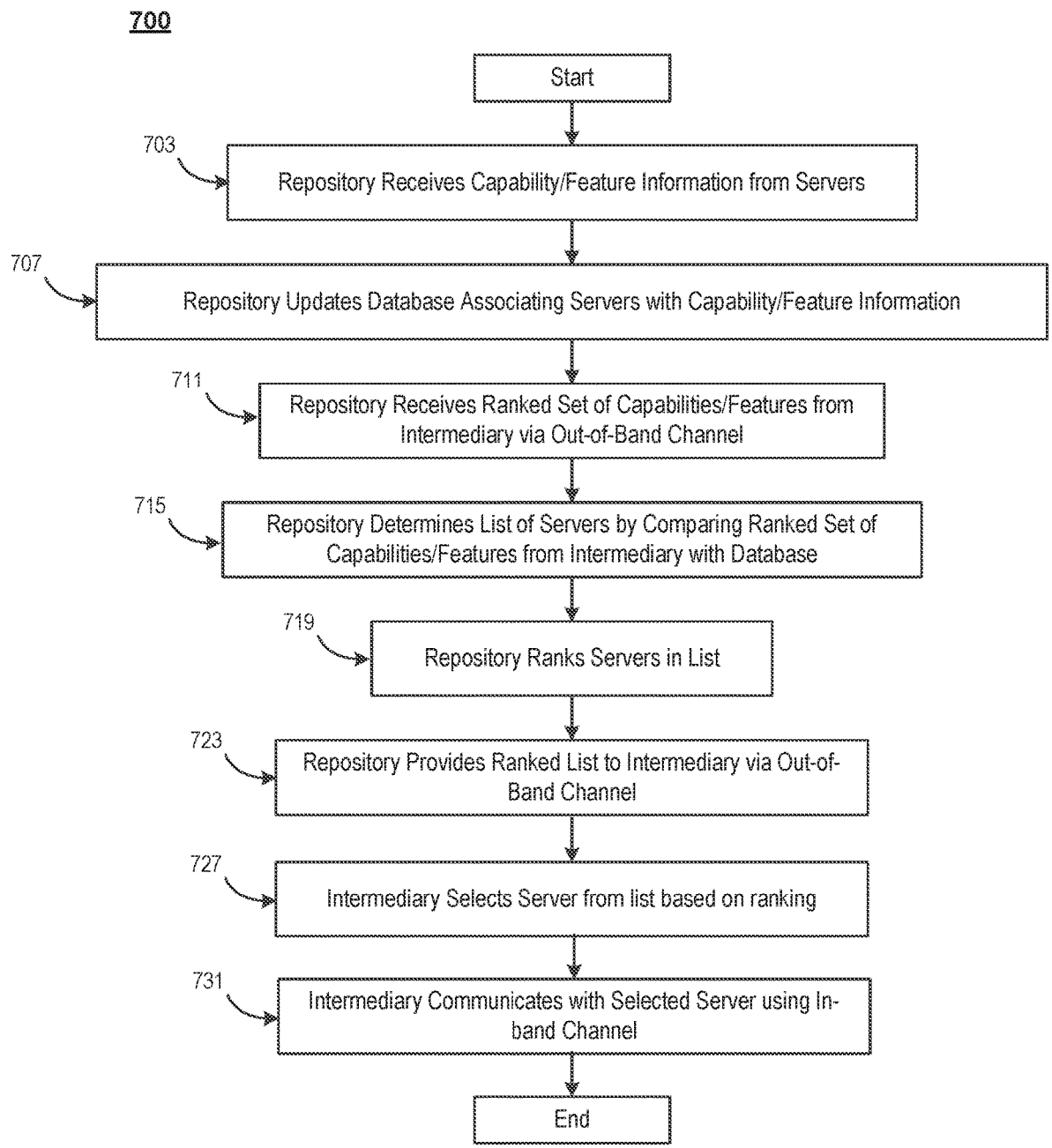
FIG. 7 shows an exemplary process for selecting a server by an intermediary, consistent with principles of the present disclosure.

FIG. 7 shows an exemplary process 700 for selecting a server by an intermediary based using out-of-band communications in accordance with embodiments of the present disclosure. At 703, a repository (e.g., repository 505) receives identification and capability information from one or more servers (e.g., servers 507 . . . 509) in a DNS ecosystem (e.g., DNS ecosystem 500) via an out-of-band communication (e.g., out-of-band channel 527). The capabilities can be the same or similar to those described previously. At 707, the repository updates a database with records that associate the identifiers of the server with their respective capabilities. For example, the database can store a record corresponding to each server. At 711, the repository receives a ranked set of capabilities and features from an intermediary (e.g., intermediary 504B) via an out-of-band channel (e.g., out-of-band channel 525). The ranked set of capabilities can be similar to that previously described. At 715, the repository determines a list of the servers that meet the set of capabilities and features received from the intermediary based on the information stored in the database at 707. At 719, the repository can rank the list of servers determined at 715 based on the set of capabilities received from the intermediary at 711. At 723, the repository provides the ranked list determined at 719 to the intermediary via an out-out-band channel (e.g. out-of-band channel 525). At 727, the intermediary selects one of the servers from the list provided at 723. At 731, the intermediary communicates with the server selected at 727 using an in-band channel (e.g., in-band channel 519).

FIG. 8 shows exemplary capability and feature information provided to a repository by an intermediary, consistent with the principles of the present disclosure. FIG. 9 shows exemplary capability and feature information provided to a repository by a server, consistent with the principles of the present disclosure. The capability and feature information of the intermediary and/or the server can be stored by the repository as records in a database, such as previously described herein.

The following examples illustrate negotiable terms of service in a case where an operator of an intermediary intends to modify its requests in a way that reduces the authoritative name server's visibility. As one example, the authoritative name server operator can ask for, and the operator of the intermediary can provide, on a periodic basis, a summary analysis of the full domain names that otherwise would have been visible to the authoritative name server. The authoritative name server operator can express its preferences in a specially designated record in the zone file, or in another place where information about the authoritative name server, the zone file or the zone itself is maintained (e.g., as an attribute in a public zone cut list like the Public Suffix List mentioned above, or in a "reverse DNS" record associated with the name server's IP address, for instance as suggested for advertising that a name server supports encryption). The record can contain instructions on the kind of summary analysis that the authoritative name server operator is asking for, and how to provide it. An intermediary employing minimized domain names, or downloading the zone file, can check for this record periodically, and if desired, provide the summary analysis.

As another example, the authoritative name server can analyze current trends for requests from the intermediary, possibly in comparison to prior trends, to estimate whether the intermediary may have changed its practices. If so, the authoritative name server operator can request in the out-of-band negotiation that a periodic summary analysis be provided. The authoritative name server might identify the operator of the intermediary based on the IP address of the intermediary, or, if an encrypted (or at least authenticated) version of the DNS protocol is employed, by the intermediary's identity in the security enhancements, e.g., within its certificate.

As another example, consistent with the two just given, the authoritative name server operator might offer compensation in exchange for the summary analysis. The compensation can be monetary, but it can also involve the exchange of data or other summary analysis, or general information services provided by the authoritative name server operator, or enhanced service features outside the normal resolution protocol, or some combination of these. The enhanced service features can include but are not limited to notifications of updates to records, perhaps in connection with 'cache purge' capabilities that replace an entry in a resolver's cache that is suspected to be erroneous before it expires.

As a further example, in addition to or instead of the summary analysis, the authoritative name server operator can request that the intermediary operator participate in an information-sharing arrangement with other intermediary operators (and perhaps with one or more authoritative name server operators as well), in order to improve insight into security threats and domain name industry metrics. The authoritative name server operator can again express its request, including the kind of information to be shared, and with whom, in a specially designated record in the zone file, and/or in another place.

As yet another example, which can also be implemented alongside the others, the authoritative name server operator can request that the intermediary operator continue to provide full domain names, but do so through an encrypted version of the DNS protocol. This can address the concern that sensitive information may be disclosed to third parties observing the communications between the intermediary and the authoritative name server. The authoritative name server operator can indicate the privacy policy that it follows when handling full domain names (or DNS requests more generally). This indication can be in the form of a certificate or other statement issued by a third party confirming the authoritative name server's conformance with the policy. The intermediary operator can check for this information and make a decision on whether to continue to provide full domain names, but to do so over an encrypted version of the DNS protocol, according to its own policy requirements.

Note that in each of these cases the intermediary's practices as well as the authoritative name server's requests can vary as a function of domain name and/or other factors. For example, the intermediary might opt to minimize domain names in certain requests but not others. Likewise, the summary analysis need not cover all requests. The authoritative name server can ask for less than the summary analysis of the requests that it can otherwise have received, and/or the intermediary can provide less than what the authoritative name server asked for, subject to applicable terms and conditions.

The authoritative name server may also provide advice to the intermediary on whether and how to perform qname minimization. For instance, the authoritative name server may advise the intermediary to forgo query-name minimization to reduce the number of queries needed between the intermediary and authoritative server, in situations where the authoritative server is responsible for names that span multiple labels within the zone. This is particularly common at many leaf zones. If the "example.com" name server is authoritative for everything below it, then for a name with many labels, qname-minimization may cause many additional queries to go to the "example.com" name server (example.com, dept.example.com, subdept.dept.example.com, www.subdept.dept.example.com), for no additional privacy benefit. Sending full query names in such a situation will obviate the need for all those intermediate queries and get the results on the first query into the zone, thereby gaining a significant performance advantage. Such authoritative servers could publish a special DNS record at their zone apex that advises resolvers to forgo query-name minimization for names within that zone. The presence of such a record (e.g. nominimize.example.com.) could be used by the resolver to make a decision to switch off qname minimization and gain the performance optimization. This information could also be published in the repository 309.

Figure 10:
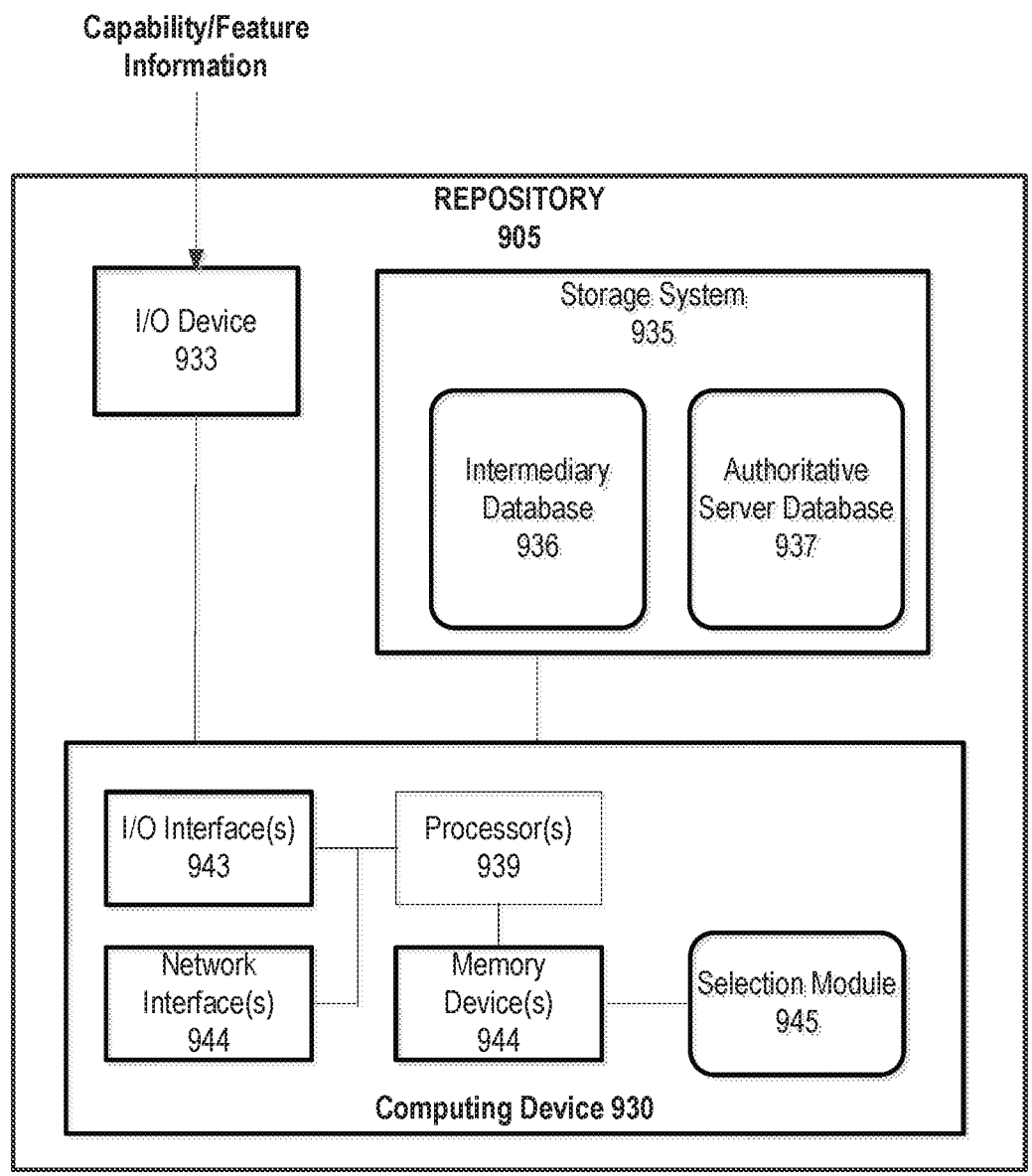
FIG. 10 shows a block diagram of an exemplary repository, consistent with principles of the present disclosure.

FIG. 10 shows a block diagram of an exemplary repository 905 in accordance with embodiments of the present disclosure. The repository 905 is a system that can provide a user-interface or application interface exchanging information defining capabilities and features provided by intermediaries (e.g., intermediaries 504A . . . 504n) and servers (e.g., servers 507 . . . 509). The repository 905 can be the same as those previously described herein (e.g., repository 505).

In accordance with aspects of the disclosure, the repository 905 includes hardware and software that perform the processes and functions described herein. In particular, the repository 905 includes a computing device 930, an input/output (I/O) device 933, and a storage system 935. The I/O device 933 can include any device that enables an individual to interact with the computing device 930 (e.g., a user interface) and/or any device that enables the computing device 930 to communicate with one or more other computing devices (e.g., clients 501A . . . 501n, intermediaries 504A . . . 504n, and servers 507 . . . 509) using any type of communication channel (e.g., out-of-band communication channels 523, 525, 527). The I/O device 933 can be for example, a handheld device, PDA, touchscreen display, handset, keyboard, etc., or a network interface for communicating with other computing devices.

The storage system 935 can comprise a computer-readable, non-volatile hardware storage device that stores information and program instructions. For example, the storage system 935 can be one or more flash drives and/or hard disk drives. Additionally, in accordance with aspects of the disclosure, the storage device 935 includes a intermediary database 936 that stores records associating intermediaries with respective capabilities and features (e.g., FIG. 8) and/or a authoritative server database 937 that stores records associating servers with respective capabilities and features (e.g., FIG. 9).

In embodiments, the computing device 930 includes one or more processors 939, one or more memory devices 941 (e.g., RAM and ROM), one or more I/O interfaces 943, and one or more network interfaces 945. The memory device 941 can include a local memory (e.g., a random access memory and a cache memory) employed during execution of program instructions. Additionally, the computing device 930 includes at least one communication channel 946 (e.g., a data bus) by which it communicates with the I/O device 933, the storage system 935.

The processor 939 executes computer program instructions (e.g., an operating system), which can be stored in the memory device 941 and/or storage system 935. Moreover, in accordance with aspects of the disclosure, the processor 939 can execute computer program instructions of a selection module 945 to perform one or more of the processes described herein. The selection module 945 can be implemented as one or more sets of program instructions in the memory device 941 and/or the storage system 935. Additionally, selection 945 can be implemented as a separate dedicated processor or a single or several processors to provide the function of these modules. In accordance with embodiments of the disclosure, the selection module 945 is computer program instructions stored in, for example, the memory device 941 and/or the storage system 935 that, when executed by the processor 939, causes the computing device 930 to select intermediaries based on sets of capabilities and/or features received from clients. Additionally, the selection module 945 can select servers based on sets of capabilities and/or features received from intermediaries. In embodiments, the selection module 945 can use various conventional ranking methods to determining relative rankings of the intermediaries and servers and select them based on their rankings.

The computing device 930 can comprise any general purpose computing article of manufacture capable of executing computer program instructions installed thereon (e.g., a personal computer, server, etc.). However, the computing device 930 is only representative of various possible equivalent-computing devices that can perform the processes described herein. To this extent, in embodiments, the functionality provided by the computing device 930 can be any combination of general and/or specific purpose hardware and/or computer program instructions. In each embodiment, the program instructions and hardware can be created using standard programming and engineering techniques, respectively.

Although the embodiments shown in FIGS. 2-10 are often described in the context of interactions between intermediaries and the root name servers, implementations consistent with the invention can be applied to the interaction between intermediaries and any authoritative name server (not just root name servers).

The foregoing description is illustrative, and variations in configuration and implementation may occur to persons skilled in the art. For instance, the various illustrative logics, logical blocks, modules, and circuits described in connection with the embodiments disclosed herein may be implemented or performed with a general purpose processor (e.g., processor 939), an application specific integrated circuit, a field programmable gate array or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a microprocessor, a plurality of microprocessors, or any other such configuration.

In one or more exemplary embodiments, the functions described may be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units (e.g., memory device 944) and executed by processors. The memory unit can be implemented within the processor or external to the processor (e.g., processor 939), in which case it can be communicatively coupled to the processor via various means as is known in the art.

If implemented in software, the functions may be stored on or transmitted over a computer-readable medium as one or more instructions or code. Computer-readable media includes both tangible, non-transitory computer storage media and communication media including any medium that facilitates transfer of a computer program from one place to another. A storage media may be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

Resources described as singular or integrated can in one embodiment be plural or distributed, and resources described as multiple or distributed can in embodiments be combined. The scope of the present teachings is accordingly intended to be limited only by the following claims. Although the invention has been described with respect to specific embodiments, those skilled in the art will recognize that numerous modifications are possible. For instance, the proxy servers can have additional functionalities not mentioned herein. In addition, embodiments of the present disclosure can be realized using any combination of dedicated components and/or programmable processors and/or other programmable devices. While the embodiments described above can make reference to specific hardware and software components, those skilled in the art will appreciate that different combinations of hardware and/or software components can also be used and that particular operations described as being implemented in hardware might also be implemented in software or vice versa.

What is claimed is:

1. A system for selecting services in a domain name system (DNS), comprising:
   a first party comprising a first computing device configured to perform request and response processing required for resolution of DNS queries;
   an in-band communication channel using a DNS protocol configured to connect the first party to a second party, wherein the second party comprises a second computing device; and
   an out-of-band communication channel configured to provide, to the second party, information regarding a set of DNS services or capabilities,
   wherein the information regarding the set of DNS services or capabilities is provided via the out-of-band communication channel for the second party to use the information regarding the set of DNS services or capabilities to select a DNS service,
   wherein the second party is configured to use, based on the selected DNS service, the in-band communication channel to connect to the first party.

2. The system of claim 1, wherein the DNS is an evolved DNS.

3. The system of claim 1, wherein the out-of-band communication channel uses a communication protocol that is different than the DNS protocol of the in-band communication channel.

4. The system of claim 3, wherein the in-band communication channel and the out-of-band communication channel are over the same communication channel.

5. The system of claim 1, wherein the out-of-band communication channel uses a protocol compatible with the DNS protocol of the in-band communication channel over the same communication channel.

6. The system of claim 1, wherein the in-band communication channel comprises a persistent communication channel, and the out-of-band communication channel comprises a non-persistent communication channel.

7. The system of claim 1, wherein the in-band communication channel and the out-of-band communication channel are separate communication channels.

8. The system of claim 1, wherein the first party provides the information regarding the set of DNS services or capabilities using the DNS protocol over the out-of-band communication channel.

9. The system of claim 8, wherein the information regarding the set of DNS services or capabilities using the DNS protocol over the out-of-band communication channel comprises a designated record in a zone file.

10. The system of claim 1, further comprising an out-of-band service, wherein the first party and the second party communicate with the out-of-band service using the out-of-band communication channel.

11. The system of claim 10, wherein the out-of-band service is at least one of the following: an online payment service, a crypto-currency exchange, a data storage service, or a communication service.

12. The system of claim 10, wherein the out-of-band communications channel comprises:
    a first out-of-band communication channel configured to connect the first party to the out-of-band service; and
    a second out-of-band communication channel configured to connect the second party to the out-of-band service; and
    the out-of-band service comprises a repository, wherein the repository is configured to:
       store the information regarding the set of DNS services or capabilities;
       provide the information regarding the set of DNS services or capabilities to the second party using the second out-of-band communication channel; and receive the information regarding the set of DNS services or capabilities using the first out-of-band communication channel.

13. The system of claim 12, wherein:
the first party is one of a plurality of intermediaries in the DNS;
the second party is one of a plurality of clients in the DNS; and
the repository is configured to provide, to the second party, a listing of the plurality of intermediaries in the DNS.

14. The system of claim 13, wherein the listing of the plurality of intermediaries in the DNS is a ranked listing of the plurality of intermediaries in the DNS.

15. The system of claim 12, wherein:
the first party is one of a plurality of authoritative servers in the DNS;
the second party is one of a plurality of intermediaries in the DNS; and
the repository provides, to the second party, a listing of the plurality of authoritative servers in the DNS.

16. The system of claim 15, wherein the listing of the plurality of authoritative servers in the DNS is a ranked listing of the plurality of authoritative servers in the DNS.

17. The system of claim 1, wherein the information regarding the set of DNS services or capabilities comprises capabilities of the first party, the capabilities including one or more of the following: reputation within the DNS, transparency, DNS Security Extension (DNSSEC) support, qname minimization, privacy, authentication capabilities, encryption capabilities, use of extension mechanisms for DNS, use of DNS cookies, messaging protocol, pipelining, name collision mitigation, government jurisdiction, malware filtering, cost, and/or payment options.

18. The system of claim 1, wherein the out-of-band communication channel performs information exchange using a messaging format that is not required for DNS resolution.

19. The system of claim 18, wherein the messaging format comprises at least one or more of: a capability set query, a capability set response, a select options message, an options grant/no grant message, an options revision message, an options grant/no grant message, an info download, an info download response message, an info upload message, and/or an info upload response message.

20. The system of claim 1, wherein the information regarding the set of DNS services or capabilities comprises information about terms of service of the first party, the terms of service including one or more of the following: messaging protocols supported, channel provisioning, authentication, encryption, resolution prioritization, resolution latency allowed, qname minimization options, zones served, zone file download options, zone and alternative database versions, reputation, and/or trust lists.

21. The system of claim 1, wherein the information regarding the set of DNS services or capabilities comprises a certificate, wherein the certificate comprises a policy of the first party.

22. The system of claim 21, wherein the policy of the first party is a privacy policy.

23. The system of claim 1, the first party comprising a plurality of first party servers, wherein the out-of-band communication channel is configured to provide a list of one or more first party servers that satisfy a set of DNS services or capabilities required by the second party.

24. A method for selecting services in a domain name system (DNS), the method comprising:
connecting a first party and a second party using an out-of-band communication channel, wherein:
the first party comprises a first computing device, configured to perform request and response processing required for resolution of DNS queries, and
the second party comprises a second computing device;
providing to the second party, via the out-of-band communication channel, an information regarding a set of DNS services or capabilities for the second party to use to select a DNS service; and
connecting the first party and the second party, based on the selected DNS service, using the in-band communication channel, wherein the in-band communication channel uses a DNS protocol.

* * * * *